United States Patent Office 3,013,040
Patented Dec. 12, 1961

3,013,040
BIS(INDENYL)IRON
John C. Brantley, Snyder, and Theodore Smist, North Tonawanda, N.Y., assignors to Union Carbide Corporation, a corporation of New York
No Drawing. Filed Sept. 23, 1953, Ser. No. 381,971
1 Claim. (Cl. 260—439)

This invention relates to bis(indenyl)iron.

An object of this invention is the provision of an iron compound containing an indenyl radical wherein the iron is linked to the organic portion by iron to carbon bonds.

Other objects of the invention will in part be obvious and will in part appear hereinafter.

The compounds of this invention may be prepared by reacting indenyl magnesium halide (indenyl Grignard reagent) with an iron halide in a suitable liquid medium. Compounds of this invention may also be prepared according to the process disclosed and claimed in the co-pending application, Maurice A. Lynch and John C. Brantley, Serial No. 381,970, filed September 23, 1953, and entitled "Process for Producing Organo Metallic Compounds," which process however forms no part of this invention. According to that process an alkali metal derivative of indene may be reacted in a suitable liquid medium with an iron halide to produce bis(indenyl)iron. Liquid media for carrying out the reaction between the indenyl Grignard reagent and iron halide include ethyl ether, benzene, and glycol dialkyl ethers. Similarly many organic solvents may be employed in the reaction of indenyl sodium with an iron halide according to the process disclosed and claimed in the co-pending application above referred to. However, glycol dialkyl ethers are particularly preferred in carrying out the reactions according to that process. The formation of the alkali metal derivative of indene may be carried out in liquid ammonia as well as in dialkyl glycol ethers.

Bis(indenyl)iron, $(C_9H_7)_2Fe$, is a purple crystalline solid melting at about 170° C. It is soluble in most organic solvents to give purple solutions but such solutions are sensitive to oxidation by air and therefore should be protected from air. The compound may be sublimed under vacuum (1 mm. Hg) at about 130° C. The products of this invention may be employed as oxygen stripping agents by reason of their sensitivity to oxidation and they also provide iron-containing compounds soluble in organic media.

As illustrative embodiments of a manner in which the invention may be practiced, the following examples are presented.

Example I 24 grams of finely divided magnesium metal in 400 ml. of ethyl ether was treated with 115 grams of ethyl bromide. After the magnesium had reacted the ether was stripped off by distillation under nitrogen and toluene was slowly added to maintain the original volume as the ether was removed. About 300 ml. of toluene was used yielding a solution of ethyl magnesium bromide boiling at 85° C. To the stirred contents of the flask under nitrogen, 116 grams of indene were added dropwise and the mixture was heated to reflux for fourteen hours until all gas evolution had ceased. While stirring the resulting toluene suspension of indenyl magnesium bromide, a solution of 54 grams of $FeCl_3$ in 250 ml. of ether was added under nitrogen atmosphere and the reaction mixture was held at 15° C. by external cooling. The mixture was stirred for about one hour and was then heated to room temperature and the stirring continued for an additional hour. The dark purple reaction product was hydrolyzed by pouring into 200 ml. of ice water containing 85 ml. of concentrated HCl. The purple toluene-ether layer was separated and dried over anhydrous calcium chloride and concentrated under reduced pressure. After concentrating to about 200 ml. volume, purple crystals were deposited which were separated and recrystallized from petroleum ether to give purple crystals of bis(indenyl)iron.

Example II

The following operations were carried out under nitrogen atmosphere. Indenyl sodium was prepared from indene and sodium in dimethyl ether of ethylene glycol. For this purpose, sodium sand in a finely divided state was produced by placing 23 grams of sodium in xylene in a flask, heating to about 120° C. with moderate stirring and when the sodium had melted, the mix was subjected to high speed stirring for about one minute. The flask was then cooled to room temperature and the xylene replaced by dimethyl ether of ethylene glycol whereupon 128 grams of indene were slowly added thereto. The reaction mixture was heated under reflux until there was no further evolution of gas. A suspension of 54 grams of ferric chloride in 700 ml. of dry dimethyl ether of ethylene glycol was prepared, and 20 grams of 325 mesh iron powder were introduced into the suspension under a nitrogen atmosphere and at room temperature with reduction being complete in about 40 minutes. The indenyl sodium solution was transferred to a dropping funnel and added to the ferrous chloride suspension under nitrogen with stirring at room temperature. The reaction mixture became purple and upon addition of 2500 ml. of distilled water there was a separation of bis(indenyl)iron which was removed by filtering. The filter cake was sensitive to air, and hence, was stored under nitrogen with the final product being obtained through extraction of the filter cake with petroleum ether in a Soxhlet extractor and crystallization from the extract. While the product is easily oxidized when in solution, it is quite stable in dry crystalline form.

Since certain changes may be made in carrying out the above process without departing from the scope of the invention, it is intended that all matter contained in the above description shall be interpreted as illustrative and not in a limiting sense.

Having described our invention, what we claim as new and desire to secure by Letters Patent is:

As a composition of matter bis(indenyl)iron having the empirical formula:

$$(C_9H_7)_2Fe$$

References Cited in the file of this patent
UNITED STATES PATENTS

| | | |
|---|---|---|
| 2,356,476 | Shappirio | Aug. 22, 1944 |
| 2,680,756 | Pauson | June 8, 1954 |

OTHER REFERENCES

Krause et al.: Die Chemie der-metall-organischen Verbindungen (1937), Edwards Bros. Inc., Ann Arbor, Michigan, 1943, pp. 43, 92.

Kealy et al.: Nature, vol. 168, pp. 1039–40, Dec. 15, 1951.

Herman et al.: Jour. Am. Chem. Soc., vol. 75, pp. 3882–3887, Aug. 20, 1953.